Figure 1:
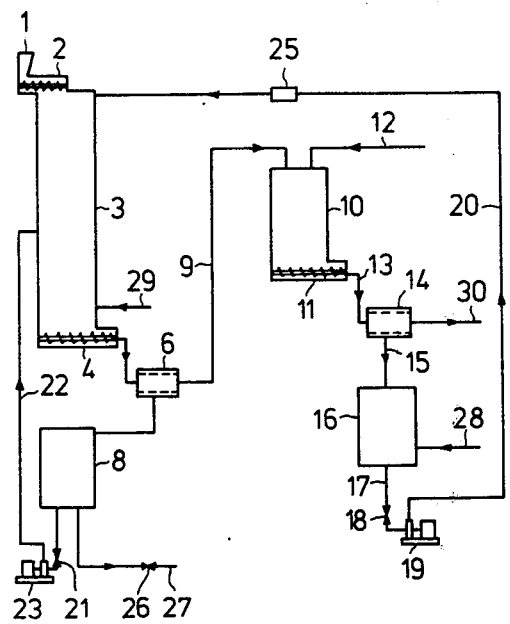

United States Patent [19]

Nyman et al.

[11] 4,025,356

[45] May 24, 1977

[54] METHOD FOR CONTINUOUS HYDROLYSIS OF PENTOSE CONTAINING MATERIAL AND APPARATUS FOR IMPLEMENTING THE METHOD

[75] Inventors: Gustaf Arthur Nyman, Tuomarila, Finland; Göte Sävö, Stockholm, Sweden

[73] Assignee: Anstalt Gemass, Vaduz, Liechtenstein

[22] Filed: Jan. 13, 1975

[21] Appl. No.: 540,685

[30] Foreign Application Priority Data

Jan. 16, 1974   Sweden ............................. 7400547

[52] U.S. Cl. ..................................... 127/1; 127/37; 162/14; 426/635
[51] Int. Cl.² ..................... A23K 1/12; C13K 1/02; C13K 13/00; D21C 7/00
[58] Field of Search .................... 127/1, 37; 162/14

[56] References Cited

UNITED STATES PATENTS

| | | | |
|---|---|---|---|
| 2,086,963 | 7/1937 | Scholler | 127/37 X |
| 2,474,669 | 6/1949 | Hering | 127/37 |
| 2,681,871 | 6/1954 | Wallace | 127/37 X |
| 2,734,836 | 2/1956 | Elian | 127/37 |
| 3,079,304 | 2/1963 | Thomsen | 127/37 X |
| 3,212,932 | 10/1965 | Hess | 127/37 |
| 3,251,716 | 5/1966 | Porter | 127/37 |
| 3,523,911 | 8/1970 | Funk | 127/1 X |
| 3,640,768 | 2/1972 | Eickemeyer | 127/37 |

*Primary Examiner*—Sidney Marantz
*Attorney, Agent, or Firm*—Allison C. Collard

[57] ABSTRACT

Method and apparatus for the continuous acid hydrolysis of pentosan-containing material at a temperature between 80° and 120° C and at a pH lower than 5. At least two portions of hydrolysate are re-cycled back into the hydrolysis vessel. One recycle portion having a lower acid concentration is supplemented with additional acid before being returned to the hydrolysis vessel.

9 Claims, 2 Drawing Figures

METHOD FOR CONTINUOUS HYDROLYSIS OF PENTOSE CONTAINING MATERIAL AND APPARATUS FOR IMPLEMENTING THE METHOD

The present invention concerns the continuous hydrolysis of materials containing pentose, at a temperature between 80° and 180° C, preferentially 100° C, and at a pH lower than 5.0.

A great deal of work has been expended in treatment of waste material containing cellulose in order to gain therefrom useful products, such as e.g. furfural, with simultaneous useful conversion of the residual product emerging from the hydrolysis. Large quantities of such waste material are burned or are squandered by using them for less qualified purposes than those which in fact are attainable. An example of such waste material is bagasse, that is the fibrous residue of the cane sugar industry, which contains a very high proportion of non-fibrous pith, as a rule approximately 30%. The pith is removed and disposed of by an expensive mechanical process e.g. by burning, while the fibrous component is processed to give cellulose products. However, bagasse may also be subjected to acid hydrolysis to gain furfural, but in which connection the fibre remaining will be stiff and brittle owing to the radical reaction conditions required, and it is therefore largely lost at refining in the form of short fibres, which are strained off together with the pentosans and with pith constituents, etc.

Another product which is similarly very inefficiently utilized is corncobs, which are obtained in immense quantities after the corn has been recovered. Such corncob residues are conventionally hydrolyzed and have been hydrolyzed for the last 50 years with 3 to 5% sulphuric acid under pressure for the producing of furfural, whereupon the resulting residue is only usable as fuel.

Other materials which are similarly wasted or poorly utilized include straw, chaff, reeds, husks of various cereals, wood residues such as shavings, chips, etc.

According to the present invention materials of this kind are now hydrolyzed in such manner that both the hydrolysis products and the hydrolysis residue can be recovered and used in a manner which is economically favourable.

A discontinuous process for producing furfural and high polymerized cellulose is disclosed in the Swedish Pat. No. 113 076, wherein the raw material used is vegetable matter from annual plants, such as rye straw choppings and oat awns, and this is hydrolyzed in a sparing way.

The hydrolysis of chaff, straw, reeds, wood chips etc. is also described in the Finnish Pat. No. 23 471. The process is continuously carried out with weak acids at a temperature over 100° C in a vertical digester, with opposed current. A similar procedure using a compression fluid is disclosed by the Finnish Pat. No. 22 455.

From the Swedish Pat. No. 143 132 a continuous hydrolysis method is known in connection with the manufacturing of furfural, and in which the hydrolysis temperature and acidity range are similar. A plurality of autoclaves are mounted side by side and the hydrolysis fluid may be conducted from one autoclave to another as the material is introduced and taken out. However, this method is not equivalent to a countercurrent principle in the true sense of the word nor with a continuously progressing feed of material through the hydrolysis vessel. The procedure cannot be characterized as a true concurrent process either. A great amount of manual work is necessary in emptying and filling the autoclaves, and the effective hydrolysis time will also be substantially shorter than in the procedure of the present invention, which furthermore requires a smaller equivalent hydrolysis volume.

Now the present invention offers substantial advantages in comparison with prior art.

The method of the invention is a continuous process and is carried out in a hydrolysis vessel into which the hydrolysis fluid is returned at different solution concentrations at different or the same levels. It is hereby possible to considerably increase the concentration of the hydrolysis fluid, which implies an improved heat economy and lower chemicals costs, in addition to which the possibilities of further treatment of the organic substance extracted improve. It is then also possible to perform a selective hydrolysis in a second step at temperatures between 140° and 180° C, preferentially 150° C, which in many instances has proved appropriate for the extraction of pentosans difficult to hydrolyze. If this temperature is exceeded, there occurs simultaneous cleaving off of water, with formation of furfural.

Initial materials rich in pith, such as bagasse, are removed by hydrolysis and go into solution, whereat the monosaccharide can be converted into a useful and usable substance. The depitched residue, which in such instances consists of fibres, can be further converted into cellulose, animal fodder or monosaccharides.

At present bagasse is used for paper manufacturing and the pith is only used as fuel. Since the pith content amounts to 30% of the dry weight of bagasse it is thus understood that the invention implies an appreciable advance.

The invention shall be more closely described in connection with the attached drawings, which show in FIG. 1, an apparatus for carrying out the procedure of the invention as a concurrent process, and in FIG. 2, a countercurrent arrangement.

The apparatus schematically presented in FIG. 1 for hydrolysis with the current has a funnel-shaped hopper 1 for introduction of the raw material into the hydrolysis vessel 3 by means of a feed device consisting of a variable speed screw 2 within a screw tube. In the upper part of the hydrolysis vessel 3 a tube 20 terminates carrying washing fluid, which is conducted from a container 16 through a pipe 17, an adjustable valve 18 and a pump 19 and is preheated in a heat exchanger 25 prior to entering the hydrolysis vessel 3.

The concentrated hydrolysate is returned from the container 8 to the lower part of the hydrolysis vessel 3 by the pipe 22 with the aid of the pump 23 and the regulating valve 21.

A feed-out means 4, consisting e.g. of a variable speed screw encircled by a tube on the bottom of the hydrolysis vessel 3, dams the hydrolysis fluid up by a continuous formation of a plug of the material already treated, the screw being shorter than the surrounding tube.

From the feed-out means the process material drops into the separator 6, where fluid and solid material are separated as completely as this can be done. The hydrolysate is conducted into the container 8 by a conduit and the treated, solid mass is transported to a diffusor 10, where washing water is added from the pipe 12. The diffusor 10 has a feed-out means 11 for solid matter on the bottom, such as for instance a screw, which carries the treated mass further to a dewatering means 14. From the dewatering means the fluid is conducted to the container 16 through the conduit 15, and the solid mass is carried off for further conversion. To the container 16 a conduit 28 has been connected for the purpose of supplying acid to the system.

Hydrolysate is pumped from the container 8 through the conduit 27, containing the regulating valve 26, for further conversion.

The mode of operation of the concurrent arrangement is that the raw material is introduced into the hydrolysis vessel 3 through the hopper 1 and screw 2 and admixed with the acid washing fluid at appr. 100°C recirculated by the conduit 20 from the container 16.

The conduit 20 discharges into the screw 1 or into the upper part of the hydrolysis vessel 3. The raw material descends under its own weight down through the hydrolysis vessel during a period of a length determined by the quantities fed in and taken out. Preferentially a hydrolysis time between 3 and 6 hours is used.

The washing fluid from the conduit 20 contains the greater part of the organic substance washed out in the diffusor 10. Fresh washing water at 50° to 100° C is conducted into the diffusor at a quantity equal to that of the fluid removed from the system.

In the dewatering means 14, which may be a screw press or a suction filter of previously known type, the mass is dewatered to appr. 50% dry matter content and it is subsequently conducted away for further conversion e.g. into cellulose, animal fodder, monosaccharides, etc.

In the container 16 the acid concentration is regulated by adding new acid to replace the very insignificant acid quantity consumed in the process.

The temperature of the washing fluid is regulated, before its introduction into the hydrolysis vessel 3, with the aid of the heat exchanger 25, and the temperature in the hydrolysis vessel 3 is kept constant by means of heat introduced by the conduit 29.

The separator 6 may be, like the dewatering means 14, a screw press or a suction filter. Part of the hydrolysis fluid separated in the separator 6 and collected in the container 8 is returned by the conduit 22 to the hydrolysis vessel 3 approximately at its middle.

The quantity of hydrolysis fluid recirculated, which is distributed in the hydrolysis vessel 3 in a suitable manner, may be regulated by means of the pump 23 to increase the concentration of organic substance in the hydrolysate as far as is technically possible. It is obvious that the foaming of the hydrolysate imposes a limit on the concentration.

From the container 8 the hydrolysate is drawn or pumped for further conversion into desired products, for instance to obtain crystllized pentose, furfural, etc., or for the producing e.g. of yeast, etc.

Figure 2:
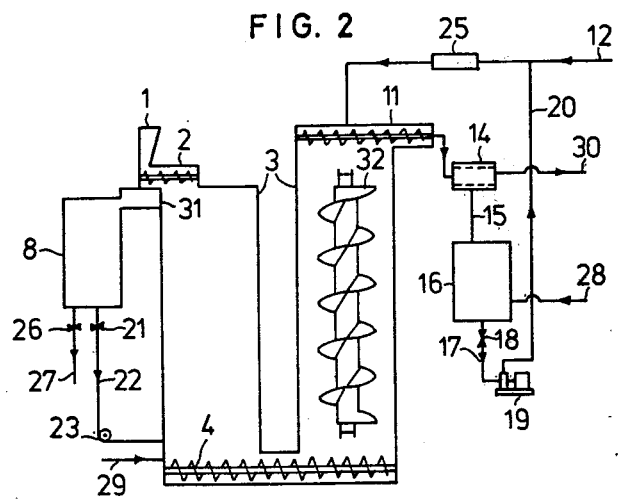

In FIG. 2 a schematic presentation is given of a counter-current arrangement for carrying out the method of the invention. From the hopper 1, the raw material is fed into the process compartment of the hydrolysis vessel 3 through the feed-in device 2. In the upper part of the hydrolysis vessel the hydrolysate is conducted to the container 8 through an aperture 31, which has been provided with a wire screen to prevent solid matter from following along with the hydrolysate. A pipe 22 has been connected to the lower part of the hydrolysis vessel 3 for returning concentrated hydrolysate from the container 8 with the aid of the pump 23 and the regulating valve 21. A conduit 29 has been connected to the lower part of the hydrolysis vessel 3 to maintain a constant temperature during the hydrolysis. On the bottom of the hydrolysis vessel 3 a transport screw 4 with variable speed has been fitted, which transports the material from the process compartment to the washing compartment in the hydrolysis vessel 3.

In the washing compartment the material is lifted by means of a vertical screw 32, or by another suitable means, up to the top, where for instance a variable speed horizontal screw 11, enclosed within a tube located outside the vessel, transports the process material on to the dewatering means 14. In the feed-out means 11 a continuous plug formation of the process material is obtained because the screw is shorter than the tube.

From the dewatering means the washing fluid is conducted to the container 16 through the pipe 15, and the solid matter is carried by the conveyor 30 to further conversion steps.

From the container 16, washing fluid is recirculated by the pipe 17, regulating valve 18 and pump 19 and through the heat exchanger 25 into the hydrolysis vessel 3. Acid can be introduced into the container 16 through a pipe 28. Fresh washing water is introduced into the pipe 20 by a pipe 12.

This apparatus operates as an ideal countercurrent arrangement. The raw material supplied through the hopper 1 and screw 2 encounters the hydrolysate which is on its way out and flows through the strainer means 31 to the container 8. The material descends by its own weight through the process compartment of the hydrolysis vessel 3, while the hydrolysate has an opposite direction of flow because the washing compartment of the hydrolysis vessel is higher than the process compartment. Part of the hydrolysate is recirculated from the container 8 through the regulating valve 21, conduit 22 and pump 23 to the bottom of the process compartment in the hydrolysis vessel 3. The process mass carried over to the washing compartment of the hydrolysis vessel 3 by the transport means 4 has an upward direction of flow in the washing compartment, while the washing fluid flows downwardly. The washing fluid is introduced in the topmost part of the hydrolysis vessel through the conduit 20 and it comes from the dewatering of the process mass in the dewatering means 14, through the conduit 15, container 16, suction conduit 17, regulating valve 18 and pump 19. Furthermore, fresh washing water is added through the conduit 12 in such quantity that the system is kept filled at all times. The temperature of the washing fluid is regulated by means of the heat exchanger 25 to be as desired. The temperature in the hydrolysis vessel is kept constant by supplying heat through the conduit 29 on the bottom of the process compartment. The acid content is maintained at a suitable level by supplying acid through the conduit 28. The process mass is conveyed away from the washing compartment of the hydrolysis vessel by the aid of the feed-out means 11 and at a dry matter content about 50% for further conversion, to become cellulose or animal fodder, for continued hydrolysis to become monosaccharides, etc.

From the container 8 the hydrolysate is pumped through the regulating valve 26 and the conduit 27 to conversion, for instance to become crystallized pentose, preferentially xylose, furfural, to yeast preparation, etc. The hydrolysis time is preferentially kept at 3 to 6 hours.

The invention is further illustrated by the following examples.

EXAMPLE 1

50 kg of residue after extraction of sugar from sugar cane, that is so-called bagasse, having a water content of 11.2%, were hydrolyzed with 435 kg of 0.5% sulphuric acid during 5 hours at 100° C with fluid circulation in concurrent mode. The quantity of organic substance extracted, referred to the imagined dry bagasse quantity, was 26.9%. The concentration in the hydrolysate amounted to 3.1%, mainly pentoses.

EXAMPLE 2

50 kg bagasse were hydrolyzed in countercurrent, but 300 kg of the hydrolysate from Experiment 1 were included and supplemented with new 0.5% sulphuric acid to make 435 kg. the quantity of extracted organic substance was found to be 25.0% and the concentration in the hydrolysate, 4.68%, mainly pentose.

EXAMPLE 3

33 kg bagasse having 9.7 % water content were hydrolyzed with 437 kg of 0.5% sulphuric acid at 98° C, with fluid circulation. The pH value of the hydrolysis fluid was 1.41. After 4 hours the quantity of substance extracted was 22%, after 5 hours it was 25.2% and after 6 hours 26.8%. The organic substance extracted consisted in its main part of monosaccharides from the pentose group. On extension of the hydrolysis time up to 10 hours, with bagasse and with the reaction conditions stated, only an insignificant increase of the pentosan extracted was noted. On the other hand an increase of the temperature to 150° C resulted in continued hydrolysis of pentosan to soluble pentose, but this imposes entirely new demands on the apparatus employed.

EXAMPLE 4

100 g of residue from corncobs, with 9.1% water content, were dismembered into pieces of walnut size and hydrolyzed with 470 g of 0.5% sulphuric acid by cooking at normal pressure with reflux. After 4 hours the quantity of substance extracted amounted to 27% and after 5 hours to 29%, whreafter only minute quantities were extracted by continued hydrolysis. The hydrolysate thus obtained mainly consisted of a pentose solution.

We claim:

1. Method for the continuous acid hydrolysis of pentosan-containing material in a hydrolysis vessel at a temperature between 80° C and 120° C and at a pH lower than 5 comprising recirculating at least two portions of the hydrolysate withdrawn from the hydrolysis vessel back into said vessel, said hydrolysate portions differing from one another in their respective acid concentrations, said portions of recirculated hydrolysate entering the hydrolysis vessel at the same or different levels and wherein a said hydrolysate portion having a lower acid concentration is supplemented with additional acid before returning to said vessel.

2. Method according to claim 1 wherein the pentosan-containing material is bagasse which is depithed by the hydrolysis, whereby the pith is detached from the fibres.

3. Method according to claim 1, wherein the solid, insoluble residue material is converted into cellulose, animal fodder or monosaccharides.

4. Method according to claim 1, wherein part of the departing hydrolysate is returned to the hydrolysis vessel at a point closer to the feed-in than to the feed-out of the raw material.

5. Method according to claim 1, wherein washing fluid is recirculated into the hydrolysis vessel together with the feed-in of raw material in a concurrent method or in the immediate vicinity of the feed-out in a countercurrent method.

6. Method according to claim 1, wherein the replacement of losses of fluid and acid takes place by additions to the washing fluid prior to its entry into the hydrolysis vessel.

7. Method according to claim 1, wherein the temperature is 100° C.

8. Method according to claim 1 wherein the solid residue resulting from the hydrolysis is subjected to further hydrolysis at a temperature between 140° C and 180° C whereby difficultly hydrolyzable pentosans are solubilized and pentose is converted to furfural.

9. Apparatus for the continuous hydrolysis of pentosan-containing material at a temperature between 60° and 120° C and at a pH lower than 5 comprising a hydrolysis vessel with a feed-in means at one end and a feed-out means at the other end and a drain for hydrolysate, means for recirculation of concentrated hydrolysate at a point between the feed-in and feed-out of the raw material, and closer to the feed-in, means for returning of weaker hydrolysate, washing fluid, at a point immediately adjacent to the feed-in of the raw material in concurrent operation and immediately adjacent to the feed-out in countercurrent operation, wherein the feed-out means has been constructed so that the hydrolysis fluid is prevented from flowing out by a continuous plug formation from the hydrolyzed, solid matter.

* * * * *

UNITED STATES PATENT OFFICE
CERTIFICATE OF CORRECTION

Patent No. 4,025,356        Dated May 24, 1977

Inventor(s) GUSTAF ARTHUR NYMAN and GÖTE SÄVÖ

It is certified that error appears in the above-identified patent and that said Letters Patent are hereby corrected as shown below:

IN THE TITLE:

Change "PENTOSE" to --PENTOSAN--

COLUMN 1, LINE 2:

Change "PENTOSE" to --PENTOSAN--

COLUMN 1, LINE 6:

Change "pentose" to --pentosan--

*Signed and Sealed this*

*Twenty-second* Day of *November 1977*

[SEAL]

Attest:

RUTH C. MASON        LUTRELLE F. PARKER
*Attesting Officer*      *Acting Commissioner of Patents and Trademarks*